United States Patent
Kumar et al.

(10) Patent No.: US 12,532,293 B2
(45) Date of Patent: Jan. 20, 2026

(54) METHOD AND SYSTEM FOR HANDLING PAGING CAUSE OF SERVICE PROVIDED BY WIRELESS NETWORK DEVICE

(71) Applicant: Samsung Electronics Co., Ltd., Suwon-si (KR)

(72) Inventors: Lalith Kumar, Bangalore (IN); Kundan Tiwari, Bangalore (IN); Rajavelsamy Rajadurai, Bangalore (IN); Varini Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 18/012,800

(22) PCT Filed: Jul. 2, 2021

(86) PCT No.: PCT/KR2021/008458
§ 371 (c)(1),
(2) Date: Dec. 23, 2022

(87) PCT Pub. No.: WO2022/005259
PCT Pub. Date: Jan. 6, 2022

(65) Prior Publication Data
US 2023/0328688 A1    Oct. 12, 2023

(30) Foreign Application Priority Data

Jul. 3, 2020 (IN) .............................. 202041028480
Sep. 25, 2020 (IN) .............................. 202041041727
Jun. 29, 2021 (IN) .............................. 2020 41028480

(51) Int. Cl.
*H04W 68/02* (2009.01)
*H04W 60/00* (2009.01)

(52) U.S. Cl.
CPC ........... *H04W 68/02* (2013.01); *H04W 60/00* (2013.01)

(58) Field of Classification Search
CPC ............................ H04W 68/02; H04W 60/00
(Continued)

(56) References Cited

U.S. PATENT DOCUMENTS

| | | | |
|---|---|---|---|
| 2011/0171915 A1 | 7/2011 | Gomes et al. | |
| 2019/0159227 A1* | 5/2019 | Talebi Fard | ...... H04W 36/0011 |
| 2020/0022104 A1 | 1/2020 | Geng et al. | |

FOREIGN PATENT DOCUMENTS

| | | |
|---|---|---|
| CA | 3087745 A1 | 7/2019 |
| KR | 10-1867524 B1 | 6/2018 |

(Continued)

OTHER PUBLICATIONS

VIVO, Discussion on the paging delivery with service type for key issue#1, S2-1910985, SA WG2 Meeting #136, Reno, USA, Nov. 8, 2019.

(Continued)

*Primary Examiner* — Joel Ajayi
(74) *Attorney, Agent, or Firm* — Jefferson IP Law, LLP

(57) ABSTRACT

Embodiments herein provide a method and a wireless network device (100) for handing a paging cause of a service. The method includes receiving, by the wireless network device (100), a NAS message includes the paging cause of the service provided by the wireless network device (100) and a first value corresponding to the paging cause from a UE (200). The method includes modifying, by the wireless network device (100), the first value of the paging cause of the service to a second value, and sending a NAS response message to the UE (200), where the NAS response message includes the paging cause of the service and the second value of the paging cause. The second value enables the UE (200)

(Continued)

to respond to a paging message based on the second value of the paging cause.

4 Claims, 15 Drawing Sheets

(58) Field of Classification Search
USPC .......................................................... 455/458
See application file for complete search history.

(56) References Cited

FOREIGN PATENT DOCUMENTS

| WO | 2018/005419 A1 | 1/2018 |
| WO | 2020/106611 A1 | 5/2020 |

OTHER PUBLICATIONS

Extended European Search Report dated Oct. 24, 2023, issued in European Patent Application No. 21832424.2.
OPPO, "Updating of solution#1 in TR23.761", SA WG2 Meeting #136 AH, Jan. 13-17, 2020, Incheon, Korea, S2-2000309, Jan. 7, 2020.
3GPP TR 23.761 V0.4.0 (Jun. 2020), 3rd Generation Partnership Project; Technical Specification Group Services and System Aspects; Study on system enablers for devices having multiple Universal Subscriber Identity Modules (USIM), (Release 17), Jun. 24, 2020.
Indian Office Action dated May 11, 2022, issued in Indian Application No. 202041028480.
European Office Action dated Aug. 4, 2025, issued in European Patent Application No. 21832424.2.

\* cited by examiner

METHOD AND SYSTEM FOR HANDLING PAGING CAUSE OF SERVICE PROVIDED BY WIRELESS NETWORK DEVICE

CROSS-REFERENCE TO RELATED APPLICATION(S)

This application is a U.S. National Stage application under 35 U.S.C. § 371 of an International application number PCT/KR2021/008458, filed on Jul. 2, 2021, which is based on and claims priority of an Indian Provisional Patent Application number 202041028480, filed on Jul. 3, 2020, in the Indian Intellectual Property Office, of an Indian Provisional Patent Application number 202041041727, filed on Sep. 25, 2020, in the Indian Intellectual Property Office, and of an Indian Complete Patent Application number 202041028480, filed on Jun. 29, 2021, in the Indian Intellectual Property Office, the disclosure of each of which is incorporated by reference herein in its entirety.

TECHNICAL FIELD

The present disclosure relates to wireless communication, and more specifically to a method and a system for handing a paging cause of a service provided by a wireless network device. The Present Application is based on and claims priority from Indian Provisional Application 202041028480 filed on 3 Jul. 2020 and 202041041727 filed on 25 Sep. 2020 the disclosure of which is hereby incorporated by reference herein.

BACKGROUND ART

Generally, a wireless network device (e.g. Base Station (BS), Access and Mobility Management Function (AMF), etc.) broadcasts paging message a User Equipment (UE) by including a paging cause. The paging cause indicates a type of services such as a voice call or a Short Message Service (SMS) is pending for the UE to receive. FIG. 1 is a schematic diagram illustrating a problem in an existing method of sending the paging message to the UE. In an example scenario, BSs (10B, 10C) are connected to an AMF (10A), where TA (13) is a tracking area of the BS (10B), and TA (14) is a tracking area of the BS (10C). A target UE (20A) which is a device authorized to receive a voice call from the AMF (10A), is connected to the BS (10B), where the target UE (20A) is located within the TA (13). An intruder UE (20B) which is a device not authorized to receive the voice call from the AMF (10A), is connected to the BS (10C), where the intruder UE (20B) is located within the TA (14).

At 11, the AMF (10A) receives a Mobile Terminal (MT) notification of the voice call to deliver to the target UE (20A). At 12, the AMF (10A) broadcasts the paging message by including the paging cause of the service, i.e. voice call to the BSs (10B, 10C). The BSs (10B, 10C) send the paging message to the target UE (20A) and the intruder UE (20B). Due to including the paging cause of the service in the paging message, the intruder UE (20B) identifies that the service is the voice call which leads for serious security concerns from privacy perspective. Thus, it is desired to provide a useful alternative to solve the problem in the existing method.

DISCLOSURE OF INVENTION

Technical Problem

The principal object of the embodiments herein is to provide a method and a system for handing a paging cause of a service provided by a wireless network device. The wireless network device randomly modifies a value of the paging cause of the service and sends the modified value to a target UE to which the service needs to deliver. A UE which intrudes to a wireless network of the target UE and the wireless network device does not have a knowledge on the modified value of the paging cause. Therefore, that UE never knows about the service providing by the wireless network device to the UE. Thus, the proposed method preserves a privacy of the service within a communication channel of the target UE and the wireless network device.

Another object of the embodiments herein is to encrypt the paging cause and broadcast the encrypted paging cause with the paging message to UEs that connected to the wireless network device. The target UE connected to the wireless network device extracts the paging cause from the paging message using a decryption key, and knows about the services that are pending to receive. The UE which intrudes to the wireless network of the target UE and the wireless network device does not have the decryption key, and that UE never knows about the service providing to the target UE. Thus, the proposed method improves a security in the wireless network.

Technical Solution

Accordingly, the embodiments herein provide a method for handing a paging cause of a service provided by a wireless network device. The method includes receiving, by the wireless network device, a Non-Access Stratum (NAS) message from a UE, where the NAS message includes the paging cause of the service provided by the wireless network device and a first value corresponding to the paging cause. The method includes modifying, by the wireless network device, the first value of the paging cause of the service to a second value to be used by the UE, where the second value enables the UE to respond to a paging message based on the second value of the paging cause. The method includes sending, by the wireless network device, a NAS response message to the UE, where the NAS response message includes the paging cause of the service and the second value of the paging cause.

In an embodiment, where the NAS message is a registration request message, and the NAS response message is a registration accept message.

In an embodiment, where the method includes modifying, by the wireless network device, the second value of the paging cause of the service to a third value, where the third value enables the UE to respond to the paging message based on the third value of the paging cause; and sending, by the wireless network device, one of a UE configuration update message and a downlink NAS transport message to the UE, where the UE configuration update message and the downlink NAS transport message include the paging cause of the service and the third value of the paging cause.

Accordingly, the embodiments herein provide a method for handing the paging cause of the service provided by the wireless network device. The method includes determining, by the wireless network device, that the UE is registered to the wireless network device. The method includes assigning, by the wireless network device, a value to the paging cause of the service providing by the wireless network device, where the value assigned to the paging cause enables the UE to respond to a paging message based on the value. The method includes sending, by the wireless network device, a NAS message to the UE, where the NAS message includes the paging cause of the service and the value of the paging cause.

In an embodiment, the method further includes modifying, by the wireless network device, the value of the paging cause of the service, where the modified value of the paging cause enables the UE to respond to the paging message based on the modified value. Further, the method includes sending, by the wireless network device, one of a UE configuration update message and a downlink NAS transport message to the UE, where the UE configuration update message and the downlink NAS transport message include the paging cause of the service and the modified value of the paging cause.

Accordingly, the embodiments herein provide the wireless network device for handing the paging cause of the service, the wireless network device. The wireless network device includes a memory, a processor, and a paging cause controller. The paging cause controller is coupled to the memory and the processor. The paging cause controller is configured for receiving the NAS message from the UE, where the NAS message includes the paging cause of the service provided by the wireless network device and the first value corresponding to the paging cause. The paging cause controller is configured for modifying the first value of the paging cause of the service to the second value to be used by the UE, where the second value enables the UE to respond to the paging message based on the second value of the paging cause. The paging cause controller is configured for sending the NAS response message to the UE, where the NAS response message includes the paging cause of the service and the second value of the paging cause.

Accordingly, the embodiments herein provide the wireless network device for handing a paging cause of a service, the wireless network device. The wireless network device includes a memory, a processor, and a paging cause controller. The paging cause controller is coupled to the memory and the processor. The paging cause controller is configured for determining that the UE is registered to the wireless network device. The paging cause controller is configured for assigning the value to the paging cause of the service providing by the wireless network device, where the value assigned to the paging cause enables the UE to respond to a paging message based on the value. The paging cause controller is configured for sending the NAS message to the UE, where the NAS message includes the paging cause of the service and the value of the paging cause. The value of the paging cause can be any new random value like numeric, characters or any combination or it can be an existing information like 5G-GUTI. The existing information can be any of the information available in the paging message as per the prior art. For example paging cause values 5G-GUTI-1 and 5G-GUTI-2 can be assigned to Paging cause-1 and Paging cause-2 respective. When UE is paged with 5G-GUTI-1 UE understands that it is for service related to Paging cause-1 and so on.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR INVENTION

Figure 1:
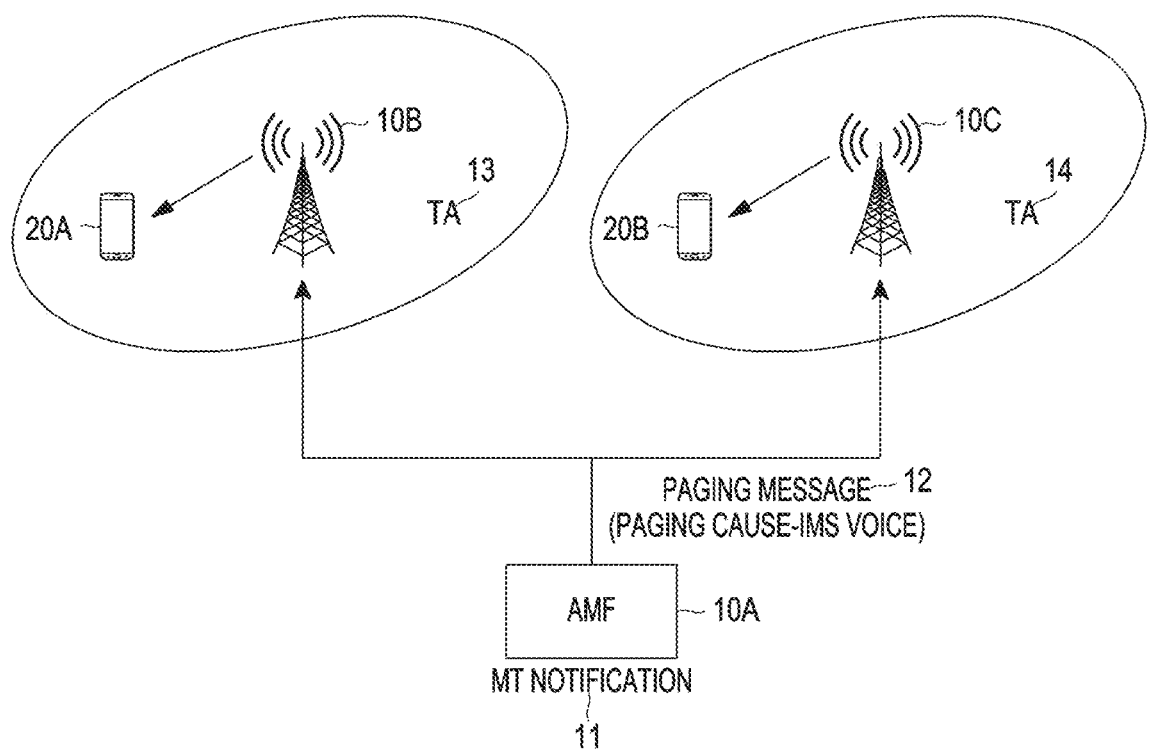
FIG. 1 is a schematic diagram illustrating a problem in an existing method of sending a paging message to a UE, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for handing a paging cause of a service provided by a wireless network device. The method includes receiving, by the wireless network device, a NAS message from a UE, where the NAS message includes the paging cause of the service provided by the wireless network device and a first value corresponding to the paging cause. The method includes modifying, by the wireless network device, the first value of the paging cause of the service to a second value to be used by the UE, where the second value enables the UE to respond to a paging message based on the second value of the paging cause. The method includes sending, by the wireless network device, a NAS response message to the UE, where the NAS response message includes the paging cause of the service and the second value of the paging cause.

Accordingly, the embodiments herein provide a method for handing the paging cause of the service provided by the wireless network device. The method includes determining, by the wireless network device, that the UE is registered to the wireless network device. The method includes assigning, by the wireless network device, a value to the paging cause of the service providing by the wireless network device, where the value assigned to the paging cause enables the UE to respond to a paging message based on the value. The method includes sending, by the wireless network device, a NAS message to the UE, where the NAS message includes the paging cause of the service and the value of the paging cause.

Accordingly, the embodiments herein provide the wireless network device for handing the paging cause of the service, the wireless network device. The wireless network device includes a memory, a processor, and a paging cause controller. The paging cause controller is coupled to the memory and the processor. The paging cause controller is configured for receiving the NAS message from the UE, where the NAS message includes the paging cause of the service provided by the wireless network device and the first value corresponding to the paging cause. The paging cause controller is configured for modifying the first value of the paging cause of the service to the second value to be used by the UE, where the second value enables the UE to respond to the paging message based on the second value of the paging cause.

The paging cause controller is configured for sending the NAS response message to the UE, where the NAS response message includes the paging cause of the service and the second value of the paging cause.

Accordingly, the embodiments herein provide the wireless network device for handing a paging cause of a service, the wireless network device. The wireless network device includes a memory, a processor, and a paging cause controller. The paging cause controller is coupled to the memory and the processor. The paging cause controller is configured for determining that the UE is registered to the wireless network device. The paging cause controller is configured for assigning the value to the paging cause of the service providing by the wireless network device, where the value assigned to the paging cause enables the UE to respond to a paging message based on the value. The paging cause controller is configured for sending the NAS message to the UE, where the NAS message includes the paging cause of the service and the value of the paging cause.

Unlike existing methods and systems, the wireless network device randomly modifies the value of the paging cause of the service and sends the modified value to a target UE to which the service needs to deliver. A UE which intrudes to a wireless network of the target UE and the wireless network device does not have a knowledge on the modified value of the paging cause. Therefore, that UE never knows about the service providing by the wireless network device to the UE. Thus, the proposed method preserves a privacy of the service within a communication channel of the target UE and the wireless network device.

Unlike existing methods and systems, the wireless network device encrypts the paging cause and broadcasts the encrypted paging cause with the paging message to UEs that connected to the wireless network device. The target UE connected to the wireless network device extracts the paging cause from the paging message using a decryption key and knows about the services that are pending to receive. The UE which intrudes to the wireless network of the target UE and the wireless network device does not have the decryption key, and that UE never knows about the service providing to the target UE. Thus, the proposed method improves a security in the wireless network.

Referring now to the drawings, and more particularly to FIGS. 2 through 15, there are shown preferred embodiments.

Figure 2:
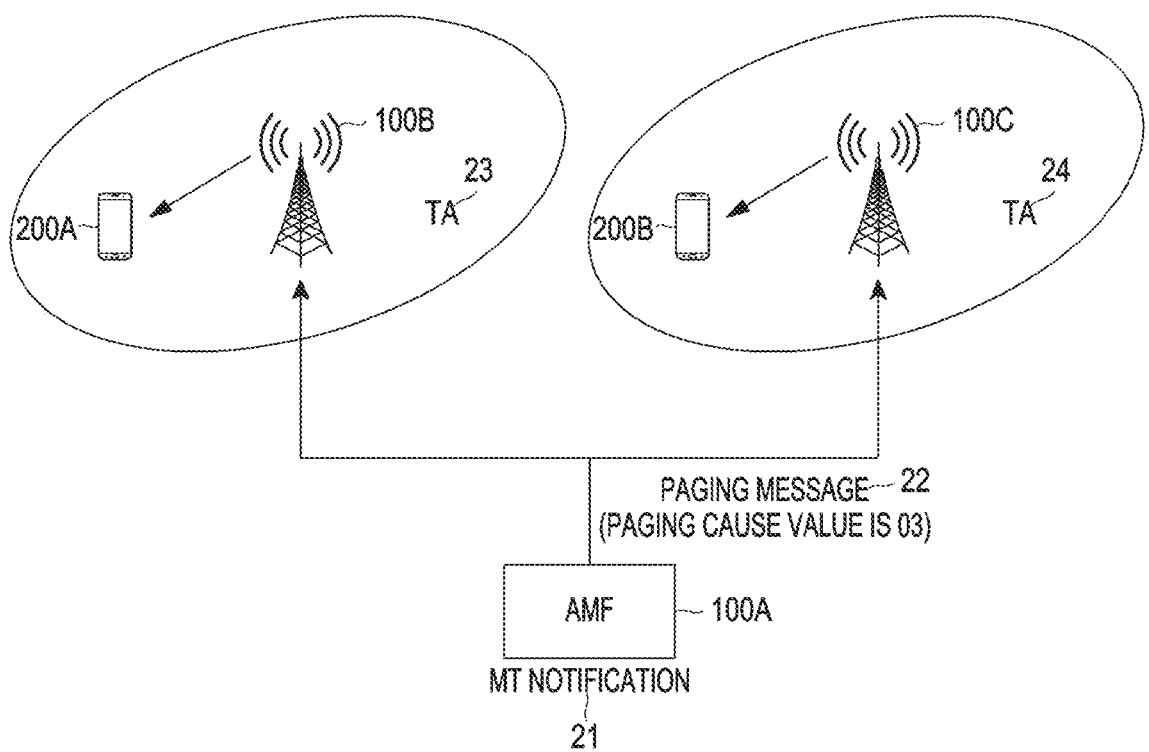
FIG. 2 is a schematic diagram illustrating a proposed method of sending the paging message to the UE by solving the problem in the existing method, according to an embodiment as disclosed herein.

FIG. 2 is a schematic diagram illustrating a proposed method of sending a paging message to a UE by solving the problem in the existing method, according to an embodiment as disclosed herein.

Consider, the BSs (100B, 100C) are connected to an AMF (100A), where TA (23) is a tracking area of the BS (100B), and TA (24) is a tracking area of the BS (100C). A target UE (200A) which is a device authorized to receive a voice call from the AMF (100A), is connected to the BS (100B), where the target UE (200A) is located within the TA (23). An intruder UE (200B) which is the device not authorized to receive the voice call from the AMF (100A), is connected to the BS (100C), where the intruder UE (200B) is located within the TA (24).

Initially, the AMF (100A) and the target UE (200A) negotiates each other to assign a value to each paging cause of a service. Consider, the AMF (100A) and the target UE (200A) negotiates finalizes the value of the paging cause of the voice call is 03. At 21, the AMF (100A) receives a MT notification of the voice call to deliver to the target UE (200A). At 22, the AMF (100A) broadcasts the paging message by including the value of the paging cause of the voice call, i.e. 03 to the BSs (100B, 100C). The BSs (100B, 100C) send the paging message to the target UE (200A) and the intruder UE (200B). The intruder UE (200B) does not understand the meaning of the value 03, in response to receiving the paging message. Further, the intruder UE (200B) never have any knowledge on the service providing by the AMF (100A) to the target UE (200A). At the same time, the target UE (200A) understands that the value 03 represents the voice call and prepares to receive the voice call from the AMF (100A), in response to receiving the paging message. Thus, the proposed method preserves a privacy of the service within a communication channel of the target UE and the AMF (100A) and improves a security in a wireless network.

Figure 3:
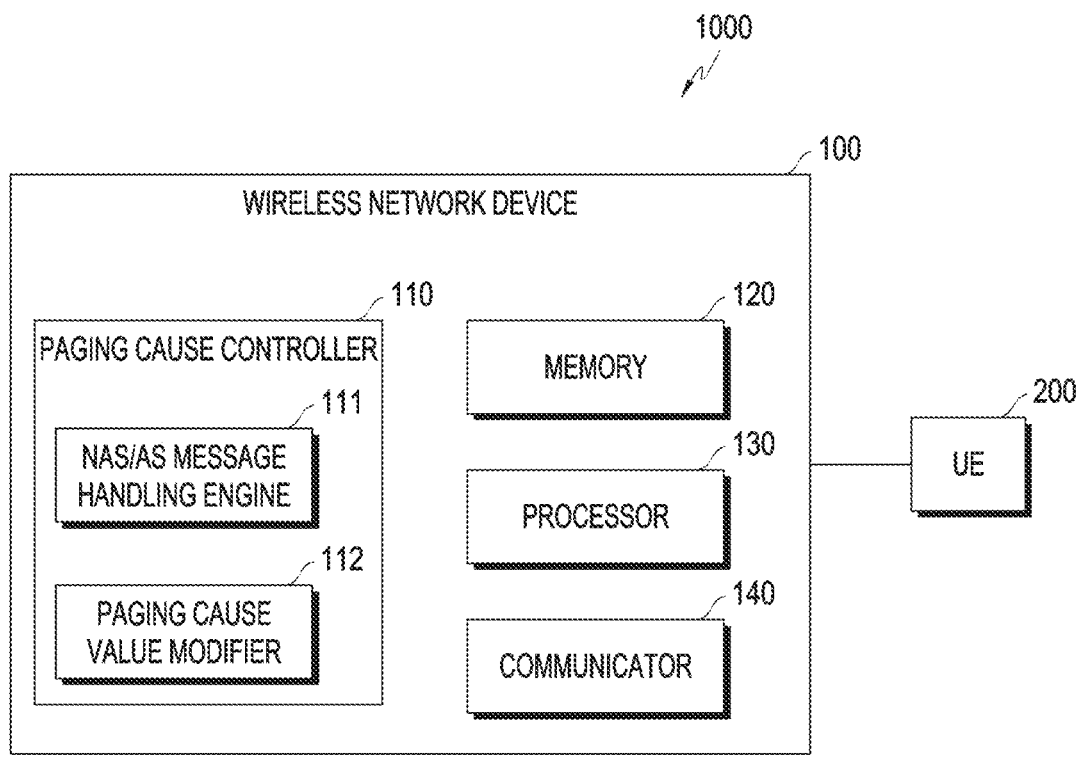
FIG. 3 is a block diagram of a wireless network device in a system for handing a paging cause of a service, according to an embodiment as disclosed herein.

FIG. 3 is a block diagram of a wireless network device (100) in a system (1000) for handing the paging cause of the service, according to an embodiment as disclosed herein. In an embodiment, the system (1000) is a wireless network between a UE (200) and the wireless network device (100). In an embodiment, the wireless network device (100) is a BS 100B (e.g. eNB, gNB) etc. In another embodiment, the wireless network device (100) is an AMF (100A). Examples of the service includes, but not limited to a voice call, a video call, a SMS, etc. Examples of the service includes, but not limited to a laptop, a smartphone, an IoT device, a wearable device, etc. In an embodiment, the UE (200) is connected to the BS (100B). In another embodiment, the UE (200) is connected to the AMF (100A) through the BS (100B).

In an embodiment, the wireless network device (100) includes a paging cause controller (110), a memory (120), a processor (130), and a communicator (140). The paging cause controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the paging cause controller (110) receives a NAS message from the UE (200). The NAS message includes the paging cause of the service provided by the wireless network device (100) and a first value (e.g. 01) corresponding to the paging cause. In an embodiment, the NAS message. is a registration request message. Further, the paging cause controller (110) modifies the first value of the paging cause of the service to a second value (e.g. 03) to be used by the UE (200). Further, the paging cause controller (110) sends a NAS response message to the UE (200). The NAS response message includes the paging cause of the service and the second value of the paging cause. In an embodiment, the NAS response message is a registration accept message. In response to receiving the NAS response message, the UE (200) identifies the second value of the paging cause and prepares to receive the service corresponding to the second value of the paging cause from the wireless network device (100). i.e. the second value in the NAS response message enables the UE (200) to respond to a paging message based on the second value of the paging cause.

The paging cause controller (110) detects that a duration (e.g. 3 minutes) is completed after delivering the NAS response message. Further, the paging cause controller (110) modifies the second value of the paging cause of the service to a third value (e.g. 04). Further, the paging cause controller (110) sends a UE configuration update message or a downlink NAS transport message to the UE (200). The UE configuration update message and the downlink NAS transport message include the paging cause of the service and the third value of the paging cause. In response to receiving the UE configuration update message or the downlink NAS transport message, the UE (200) identifies the third value of the paging cause and prepares to receive the service corresponding to the third value of the paging cause from the wireless network device (100). i.e. the third value enables the UE (200) to respond to the paging message based on the third value of the paging cause.

In alternate embodiment, the paging cause controller (110) determines that the UE (200) is registered to the wireless network device (100). Further, the paging cause controller (110) assigns a value (e.g. 01) to the paging cause of the service providing by the wireless network device (100). Further, the paging cause controller (110) sends a NAS message to the UE (200), where the NAS message includes the paging cause of the service and the value of the paging cause. In response to receiving the NAS message, the UE (200) identifies the value of the paging cause and prepares to receive the service corresponding to the value of the paging cause from the wireless network device (100). i.e. the value assigned to the paging cause enables the UE (200) to respond to a paging message based on the value.

The paging cause controller (110) detects that the duration (e.g. 3 minutes) is completed after delivering the NAS message. Further, the paging cause controller (110) modifies the value of the paging cause of the service. Further, the paging cause controller (110) sends the UE configuration update message or the downlink NAS transport message to the UE (200). The UE configuration update message and the downlink NAS transport message comprise the paging cause of the service and the modified value of the paging cause. In response to receiving the UE configuration update message or the downlink NAS transport message, the UE (200) identifies the modified value of the paging cause and prepares to receive the service corresponding to the modified value of the paging cause from the wireless network device (100). i.e. the modified value of the paging cause enables the UE (200) to respond to the paging message based on the modified value.

The memory (120) stores a current value assigned to the paging cause of the service and other values that may randomly choose for the paging cause. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the wireless network device (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the wireless network device (100). Further, the communicator (140) is configured to facilitate the communication between the wireless network device (100) and other devices via one or more networks (e.g. Radio technology). The communicator (140) includes an electronic circuit specific to a standard that enables wired or wireless communication.

In an embodiment, the paging cause controller (110) includes a NAS/AS message handling engine (111) and a paging cause value modifier (112). The NAS/AS message handling engine (111) and the paging cause value modifier (112) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In another embodiment, the NAS/AS message handling engine (111) receives the NAS message includes the paging cause of the service provided by the wireless network device (100) and the first value (e.g. 01) corresponding to the paging cause from the UE (200). Further, the paging cause value modifier (112) modifies the first value of the paging cause of the service to the second value (e.g. 03) to be used by the UE (200). Further, the NAS/AS message handling engine (111) sends the NAS response message includes the paging cause of the service and the second value of the paging cause to the UE (200). The paging cause value modifier (112) detects that the duration (e.g. 3 minutes) is completed after delivering the NAS response message.

Further, the paging cause value modifier (112) modifies the second value of the paging cause of the service to the third value (e.g. 04). Further, the NAS/AS message handling engine (111) sends the UE configuration update message or a downlink NAS transport message to the UE (200), where the UE configuration update message and the downlink NAS transport message include the paging cause of the service and the third value of the paging cause.

In another embodiment, the paging cause value modifier (112) determines that the UE (200) is registered to the wireless network device (100). Further, the paging cause value modifier (112) assigns the value (e.g. 01) to the paging cause of the service providing by the wireless network device (100). Further, the NAS/AS message handling engine (111) sends the NAS message to the UE (200), where the NAS message includes the paging cause of the service and the value of the paging cause.

The paging cause value modifier (112) detects that the duration (e.g. 3 minutes) is completed after delivering the NAS message. Further, the paging cause value modifier (112) modifies the value of the paging cause of the service. Further, the NAS/AS message handling engine (111) sends the NAS message like UE configuration update message or the downlink NAS transport message to the UE (200), where the UE configuration update message and the downlink NAS transport message comprise the paging cause of the service and the modified value of the paging cause.

Although the FIG. 3 shows the hardware components of the wireless network device (100) but it is to be understood that other embodiments are not limited thereon. In other embodiments, the wireless network device (100) may include less or more number of components. Further, the labels or names of the components are used only for illustrative purpose and does not limit the scope of the invention. One or more components can be combined together to perform same or substantially similar function for handing the paging cause of the service.

Figure 4:
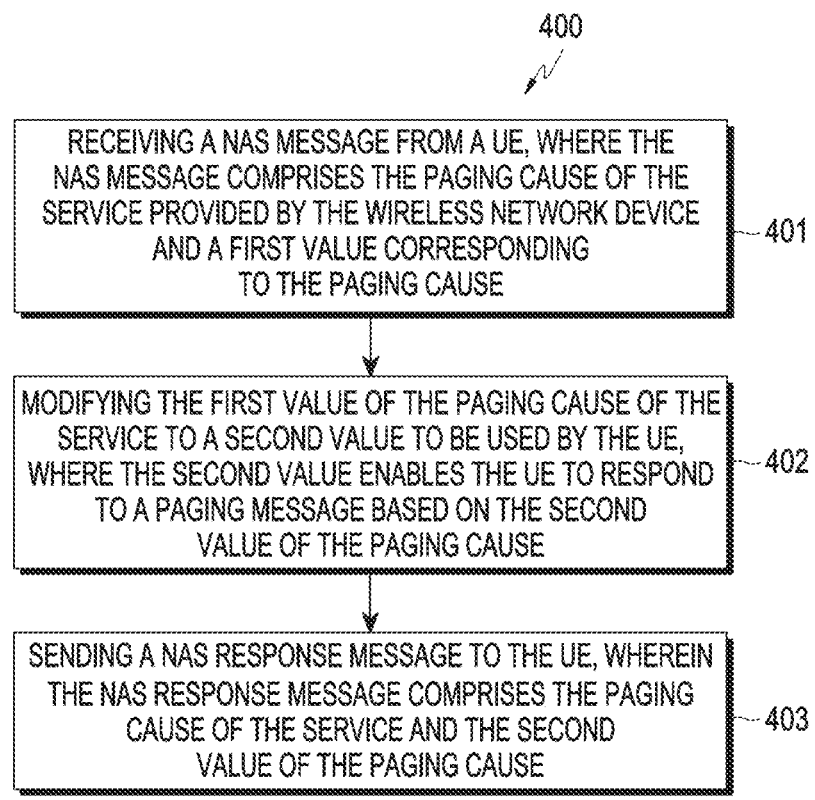
FIGS. 4-5 are flow diagrams illustrating a method for handing the paging cause of the service using the wireless network device, according to an embodiment as disclosed herein.

FIG. 4 is a flow diagram 400 illustrating a method for handing the paging cause of the service using the wireless network device (100), according to an embodiment as disclosed herein. At step 401, the method includes receiving the NAS message from the UE (200), where the NAS message includes the paging cause of the service provided by the wireless network device (100) and the first value corresponding to the paging cause. At step 402, the method includes modifying the first value of the paging cause of the service to the second value (the second value can be same as what was proposed by UE (200) or different value) to be used by the UE (200), where the second value enables the UE (200) to know the service pending to be delivered to the UE (200) due to which paging message is sent and respond to the paging message based on the second value of the paging cause. At step 403, the method includes sending the NAS response message to the UE (200), where the NAS response message includes the paging cause of the service and the second value of the paging cause. In an embodiment, the paging cause controller (110) performs the steps 401-403 in the flow diagram 400.

Figure 5:
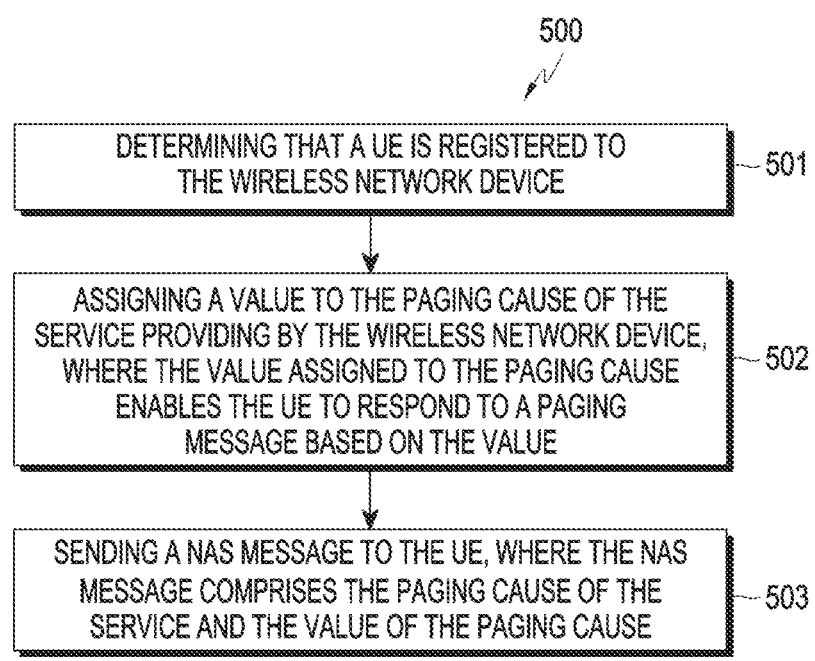

FIG. 5 is a flow diagram 500 illustrating a method for handing the paging cause of the service using the wireless network device (100), according to an embodiment as disclosed herein. At step 501, the method includes determining that the UE (200) is registered or registering to the wireless network device (100). At step 502, the method includes assigning the value to the paging cause of the service providing by the wireless network device (100), where the value assigned to the paging cause enables the UE (200), to identify the service pending to be delivered to the UE (200) and to respond to the paging message based on the value. At step 503, the method includes sending the NAS message to the UE (200), where the NAS message includes the paging cause of the service and the value of the paging cause. In an embodiment, the paging cause controller (110) performs the steps 501-503 in the flow diagram 500.

The various actions, acts, blocks, steps, or the like in the flow diagrams 400, 500 may be performed in the order presented, in a different order or simultaneously. Further, in some embodiments, some of the actions, acts, blocks, steps, or the like may be omitted, added, modified, skipped, or the like without departing from the scope of the invention.

Figure 6:
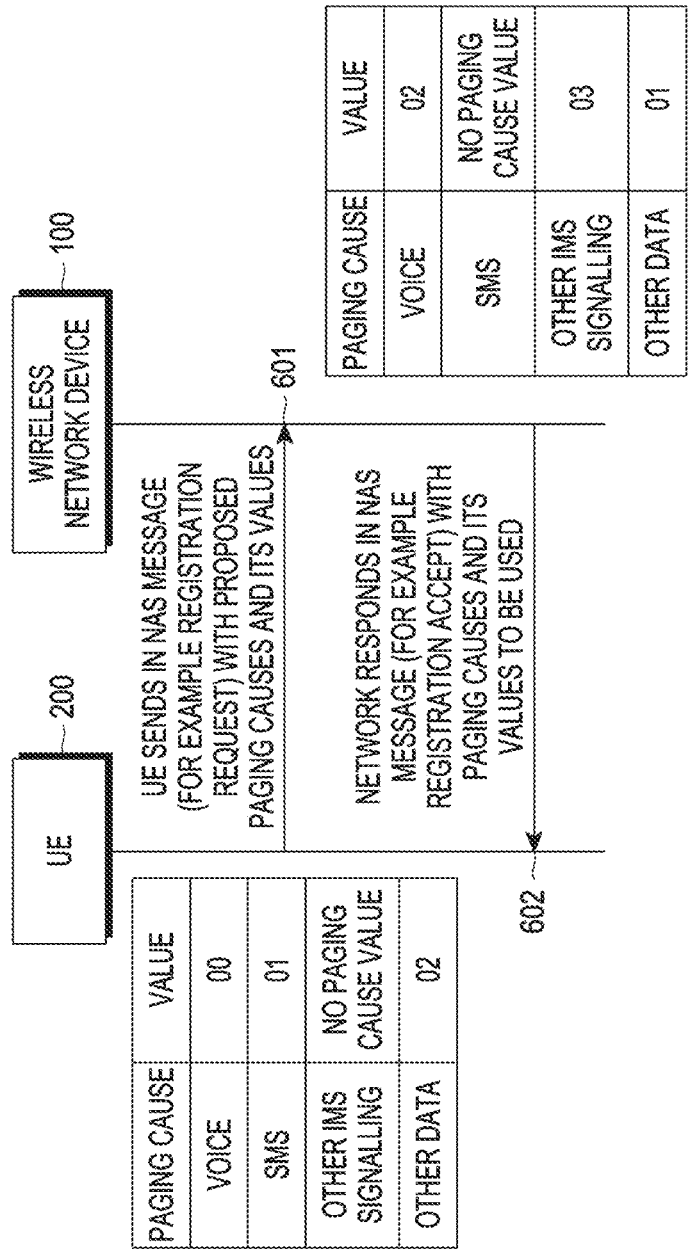
FIG. 6 is a sequential diagram illustrating signaling between the wireless network device and the UE for randomizing values of paging causes, according to an embodiment as disclosed herein.

FIG. 6 is a sequential diagram illustrating signaling between the wireless network device (100) and the UE (200) for randomizing values of paging causes, according to an embodiment as disclosed herein. The UE (200) and the wireless network device (100) negotiate the value of each paging cause during NAS procedures. At 601, the UE (200) proposes different values of the paging causes required from the wireless network device (100) in the NAS message as given in table 1 during a registration procedure.

TABLE 1

| Paging cause | Value |
| --- | --- |
| Voice | 00 |
| SMS | 01 |
| Other IMS signalling | No paging cause value |
| Other data | 02 |

At 602, the wireless network device (100) indicates to the UE (200) about different paging values corresponding to different services (or type of traffic) the wireless network device (100) will use as given in table 2.

TABLE 2

| Paging cause | Value |
| --- | --- |
| Voice | 02 |
| SMS | No paging cause value |
| Other IMS signalling | 03 |
| Other data | 01 |

The wireless network device (100) and the UE (200) will also negotiate if the paging cause does not include what service it pertains to. For example no paging cause in the paging message indicates that the service is SMS in the table 2. When the wireless network device (100) pages the UE (200), the wireless network device (100) indicates the corresponding negotiated values which are known only to the wireless network device (100) pages the (200). With this the privacy issue can be resolved as shown in the FIG. 2.

The UE (200) obtains the values of the paging cause or a paging mask value whenever the UE goes from an idle mode to a connected mode or from a radio resource control inactive (i.e. RRC_INACTIVE) state to the connected mode or whenever the UE (200) goes to the RRC_INACTIVE state. In another embodiment, the UE (200) receives the paging cause values from the wireless network device (100) frequently. A frequency of sending the paging cause values to the UE (200) is decided based on an operator implementation/network policy/configuration. The wireless network device (100) decides to update the paging cause values or the paging mask value to the UE (200), using the NAS messages like the UE configuration update or the downlink (DL) NAS transport messages. The UE (200) triggers the NAS procedure to renegotiate the paging cause values based on a UE implementation.

In an embodiment, a Radio Access Network (RAN) can negotiate separate the paging cause values during a Radio Resource Control (RRC) procedure to be used which are applicable when the UE (200) is in an inactive state. In another embodiment, the paging cause used for the RRC procedure can be negotiated between the UE (200) and the AMF (100A) during the NAS procedure. After the paging cause is negotiated between the UE (200) and the AMF (100A), the AMF (100A) updates a latest negotiated paging cause to the RAN using a Next Generation Application Protocol (NGAP) message. In another embodiment, a core network can negotiate separately the paging cause values using the NAS procedure to be used when the UE (200) is in the idle state. The wireless network device (100) pages the UE (200) with the negotiated paging cause value. This paging cause value belongs to which service is known only to the UE (200) and the wireless network device (100), thus an intruder cannot identify the paging is for which service.

The AMF (100A) provides the assigned paging cause values to the BS (100B) using N2 signaling. In fact the AMF (100A) does not include the paging cause value for negotiated service which corresponds to no paging cause value. In yet another embodiment, without the requests form the UE (200), the wireless network device (100) itself provides the randomized paging cause values as described in the proposed method. The randomization technique discussed in this solution can be used for protecting the paging cause values too. That is the wireless network device (100) (i.e. either core network or RAN node) assigns the different cause values for each of the establishment cause, resume cause or re-establishment cause values in the NAS or AS signaling message to the UE (200). The UE uses this values instead of standard cause values, so that the privacy is protected.

Figure 7:
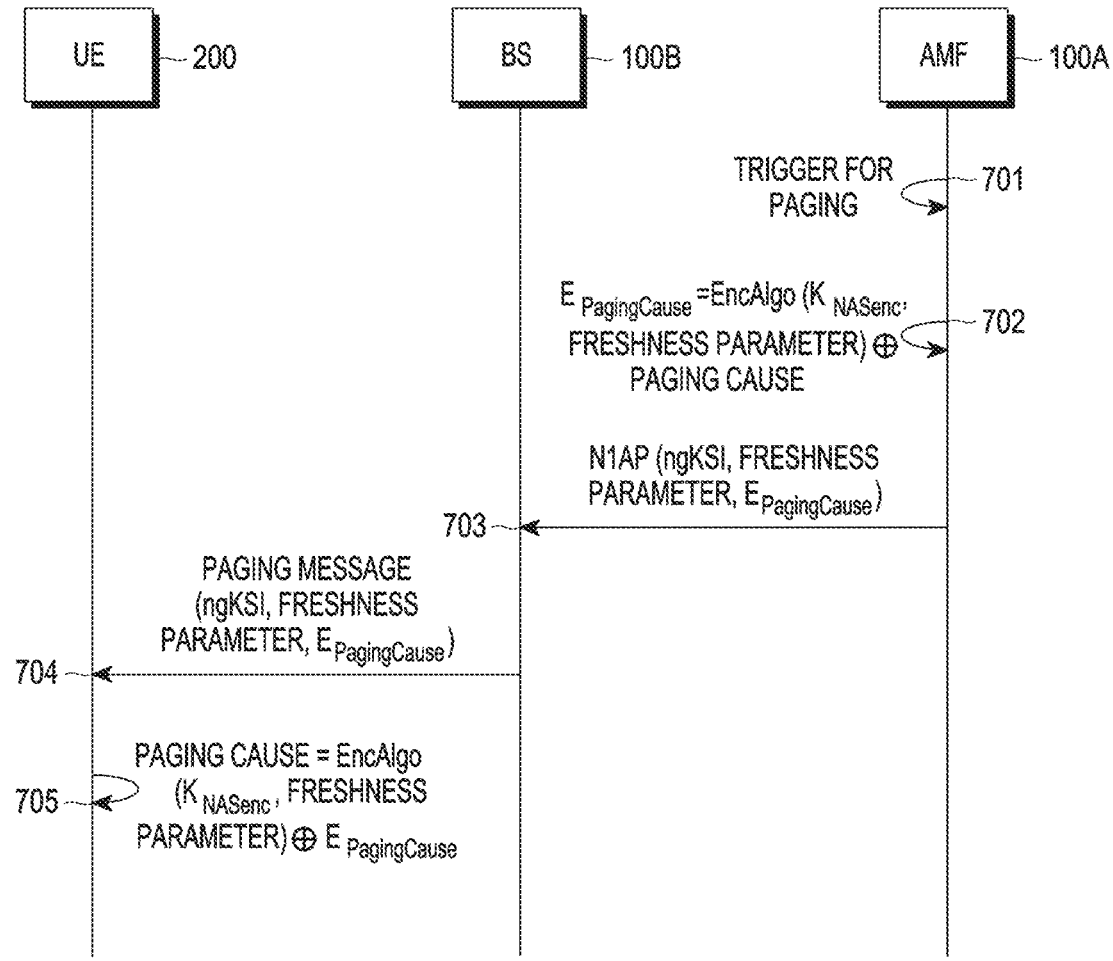
FIG. 7 is a sequential diagram illustrating signaling between the wireless network device and the UE for protecting the paging causes using a NAS security, according to an embodiment as disclosed herein.

FIG. 7 is a sequential diagram illustrating signaling between the wireless network device (100) and the UE (200) for protecting the paging causes using a NAS security, according to an embodiment as disclosed herein. Initially, the UE (200) and the AMF (100A) establish a NAS security context, as part of the registration procedure. At 701, whenever the UE (200) is in the idle state and a downlink signalling or data is received, the AMF (100A) pages the UE (200) with a paging cause indication type of the pending service. At 702, in response to receiving a trigger for the paging message, the AMF (100A) generates the encrypted paging cause. The paging cause values are encrypted (or encoded) with the NAS security context parameters established between the AMF (100A) and the UE (200).

An encrypted paging cause, EPaging Cause=EncAlgo (KNASenc, freshness parameter, OPP)(+)paging cause. EncAlog is an AMF selected encryption method which is stored as part of the NAS security context. KNASenc is a NAS signalling message encryption key stored as part of the NAS security context. The freshness parameter being at least one of a random number, a counter value, a Globally Unique Temporary Identifier (GUTI), a length of the paging cause value, which is used as input to the encryption method to generate a fresh key streams every time. OPP is other possible parameters such as the length of the paging cause. KNASenc, the freshness parameter, OPP are used as input parameters for the encryption method for generation of the key stream. An XOR operation of the generated key stream from the encryption method and the paging cause is the EPaging Cause, which is transmitted to the UE (200) through the wireless network.

At 703, the AMF (100A) signals a N1AP message includes a ngKSI, the freshness parameter, and the encrypted paging cause to the BS (100B), where the ngKSI indicates a current NG NAS security context. At 704, the BS (100B) sends the paging message including the ngKSI, the freshness parameter, and the encrypted paging cause to the UE (200). If the ngKSI is included in the paging message, then the UE (200) confirms whether the security context used by the AMF (100A) is the same as the UE stored security context. At 705, in response to receiving the paging message, the UE (200) extracts the paging cause from the paging message using the NAS signalling message encryption key, the freshness parameter, and the encrypted paging cause. The mechanism to protect the paging cause as discussed in this embodiment can be used to protect the cause values i.e. RRC establishment cause, RRC resume cause or RRC-reestablishment cause values while sending from the UE (200) to the wireless network device (100).

Figure 8:
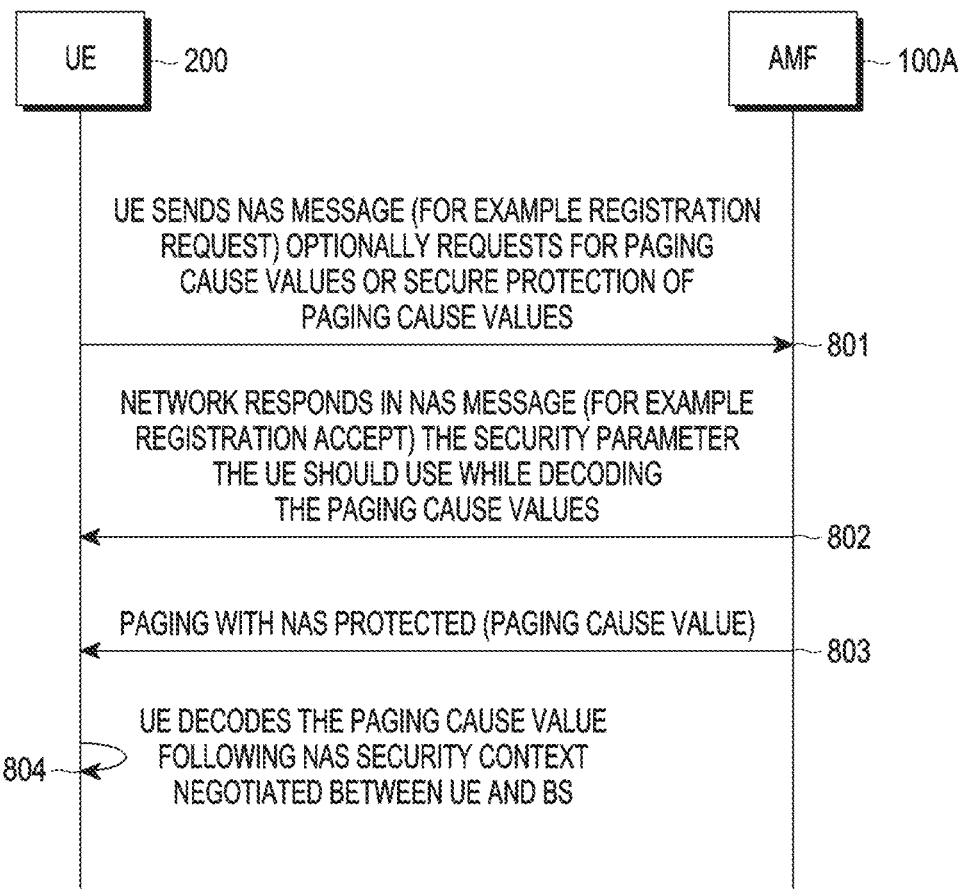
FIG. 8 illustrates a flow diagram of a method for protecting the paging causes using the NAS security, according to an embodiment as disclosed herein.

FIG. 8 illustrates a flow diagram of a method for protecting the paging causes using the NAS security, according to an embodiment as disclosed herein. At 801, the UE (200) sends the NAS message (for example registration request) to the AMF (100A) by optionally requesting for the paging cause values or a secure protection of paging cause values. At 802, the AMF (100A) responds to the UE (200) with the NAS message (for example registration accept) includes the security parameter the UE (200) should use while decoding the paging cause values. At 803, the AMF (100A) sends the paging message with the NAS protected or encrypted paging cause value to the UE (200). At 804, the UE (200) decodes the encrypted paging cause value using the security parameter negotiated between the UE (200) and the BS (100B).

Figure 9:
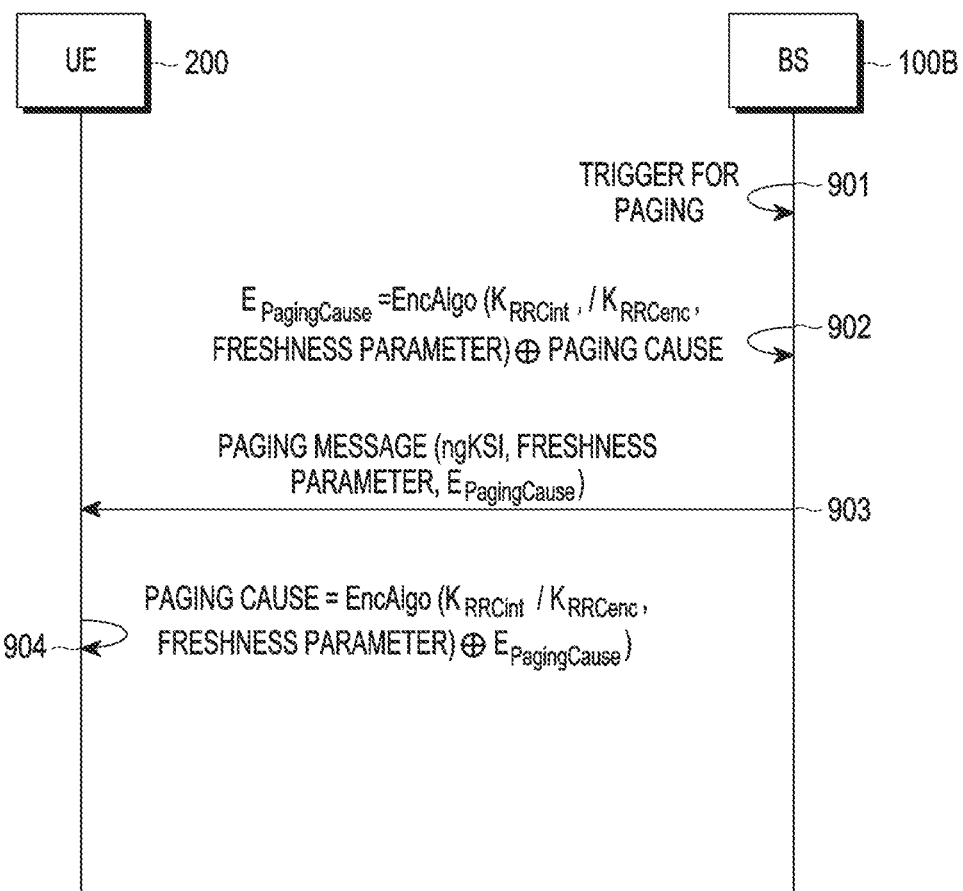
FIG. 9 is a sequential diagram illustrating signaling between the wireless network device and the UE for protecting the paging causes using an Access Stratum (AS) security, according to an embodiment as disclosed herein.

FIG. 9 is a sequential diagram illustrating signaling between the wireless network device (100) and the UE (200) for protecting the paging causes using an AS security, according to an embodiment as disclosed herein. In another embodiment, the UE (200) and the wireless network device (100) negotiates a AS security context initially. At 901, whenever the UE (200) is in the inactive state and the downlink signalling or the data is received, the wireless network device (100) pages with the paging cause indication type of the pending service to the UE (200). At 902, in response to receiving a trigger for the paging message, the BS (100B) generates the encrypted paging cause. The paging cause values is encrypted (or encoded) with the AS security context negotiated between the UE (200) and the wireless network device (100) (e.g. BS (100B)).

The encrypted paging cause, EPagingCause=EncAlgo (KRRCint/KRRCenc, freshness parameter, OPP) (+) paging cause. EncAlog is a BS selected encryption method which is stored as part of the AS security context. KRRCint and KRRCenc are the AS signalling message integrity protection key and encryption key respectively, stored as part of the AS security context. The key KRRCint or KRRCenc is used as the input parameter in the encryption method. If the BS (100B) is going to use the key KRRCenc as the input parameter in the encryption method, then the BS (100B) stores the key along with the AS security context, when the UE (200) transits to the RRC_INACTIVE state. That is, the BS (100B) shall not delete the current AS key KRRCenc after sending the RRCRelease with suspendConfig message to the UE (200), but shall keep the current AS keys KRRCenc along with the KRRCint. The freshness parameter being at least one of the random number, the counter value, the GUTI, the length of the paging cause value, which is used as the input to the encryption method to generate the fresh key streams every time. OPP is the other possible parameters such as the length of the paging cause. KRRCint or KRRCenc, freshness parameter, OPP are used as input parameters for the encryption method, for generation of the key stream. The XOR of the generated key stream from the encryption method and the paging cause is the EPaging Cause, which is transmitted to the UE (200) through the wireless network.

In an embodiment, the EncAlgo is at least one of a Null ciphering method (NEA0), a 128-bit SNOW 3G based method (NEA1), a 128-bit AES based method (NEA2), a 128-bit ZUC based method (NEA3). The mechanism to protect the paging cause as discussed in this embodiment can be used to protect the cause values i.e. RRC establishment cause, RRC resume cause or RRC-reestablishment cause values while sending from the UE (200) to the wireless network device (100).

At 903, the BS (100B) signals the paging message includes the ngKSI, the freshness parameter, and the encrypted paging cause to the UE (200). In an embodiment, if the BS (100B) receives the ngKSI from the AMF (100A), then the ngKSI is transmitted along with the paging message. If the ngKSI is included in the paging message, then the UE (200) identifies whether the security context used by the AMF (100A) is the same as the UE stored security context. At 904, in response to receiving the paging message, the UE (200) extracts the paging cause from the paging message using the NAS signalling message encryption key, the freshness parameter, and the encrypted paging cause.

Figure 10:
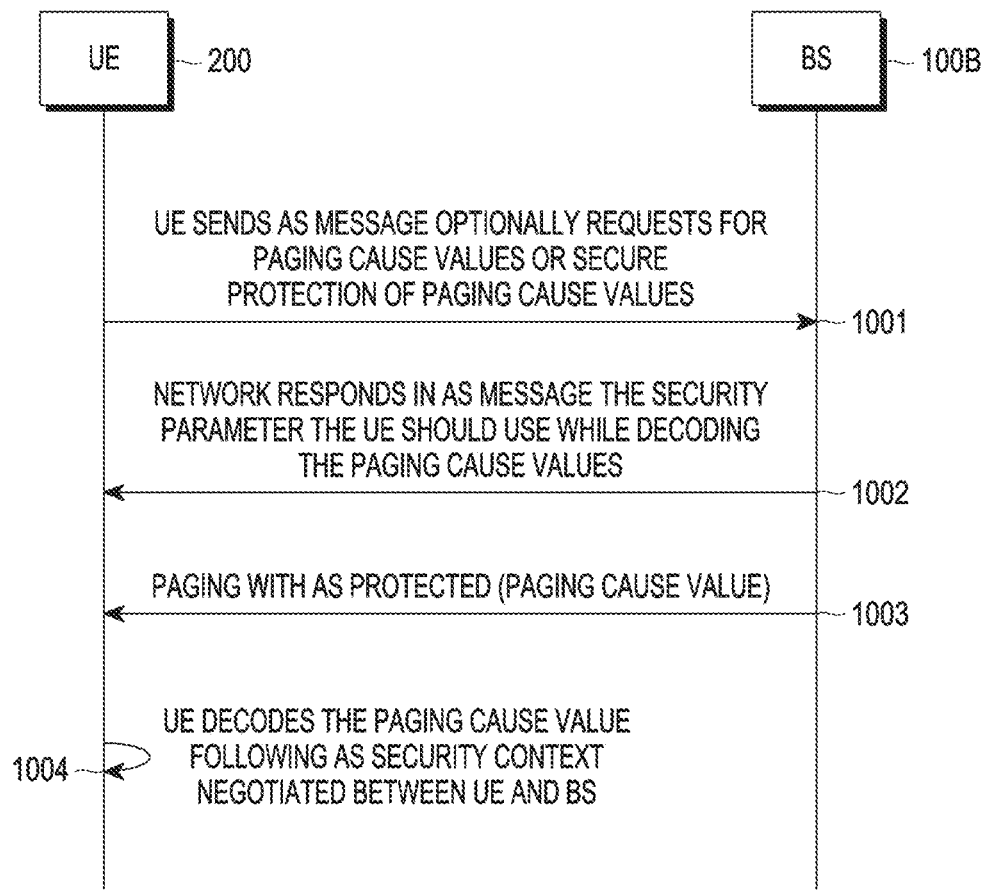
FIG. 10 illustrates a flow diagram of a method for protecting the paging causes using the AS security, according to an embodiment as disclosed herein.

FIG. 10 illustrates a flow diagram of a method for protecting the paging causes using the AS security, according to an embodiment as disclosed herein. At 1001, the UE (200) sends the AS message to the BS (100B) by optionally requesting for the paging cause values or the secure protection of the paging cause values. At 1002, the BS (100B) responds to the UE (200) with the AS message includes the security parameter the UE (200) should use while decoding the paging cause values. At 1003, the BS (100B) sends the paging message with the AS protected paging cause value to the UE (200). At 1004, UE (200) decodes the paging cause value following AS security context negotiated between the UE (200) and the BS (100B).

Figure 11:
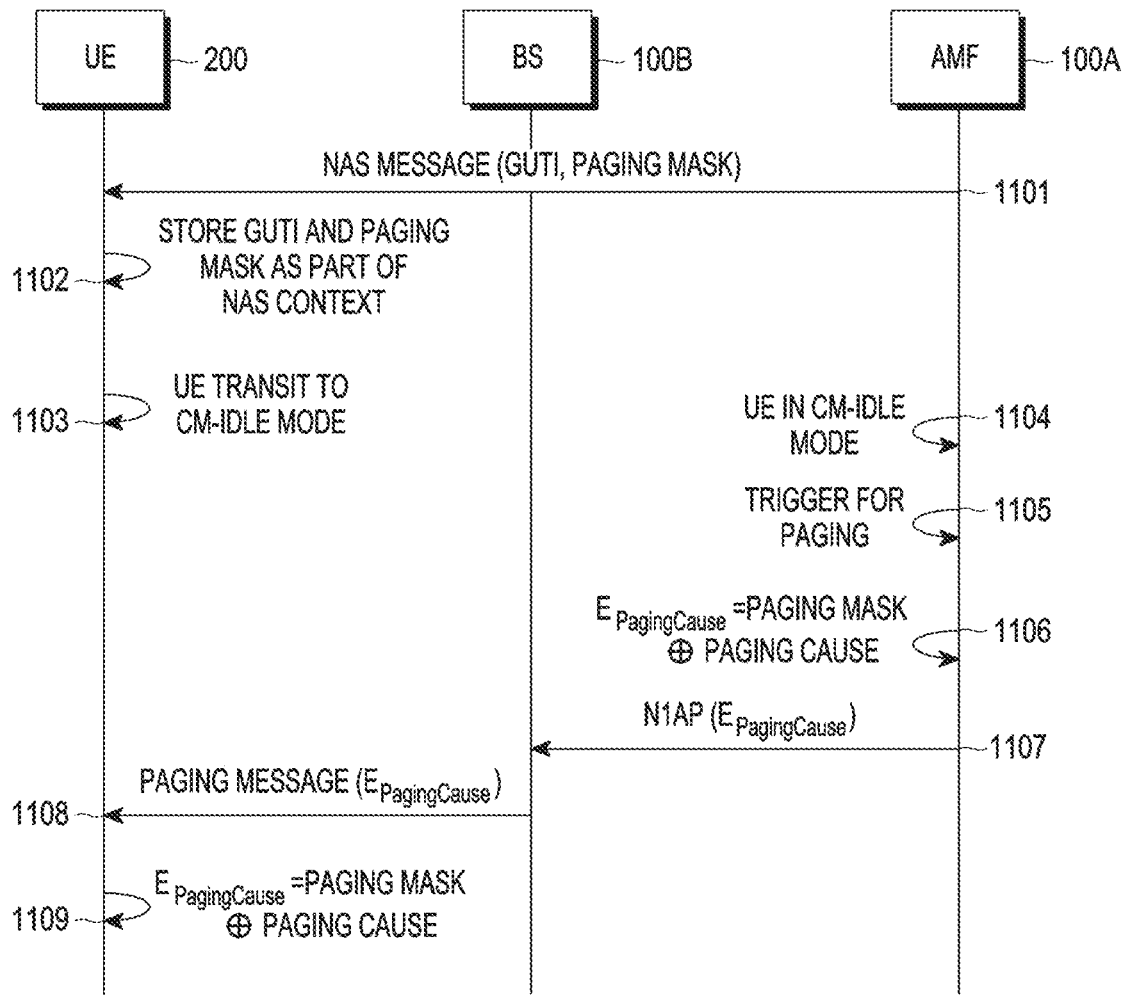
FIGS. 11-12 are sequential diagrams illustrating signaling between the wireless network device and the UE for protecting the paging causes using a paging mask, according to an embodiment as disclosed herein.
Figure 12:
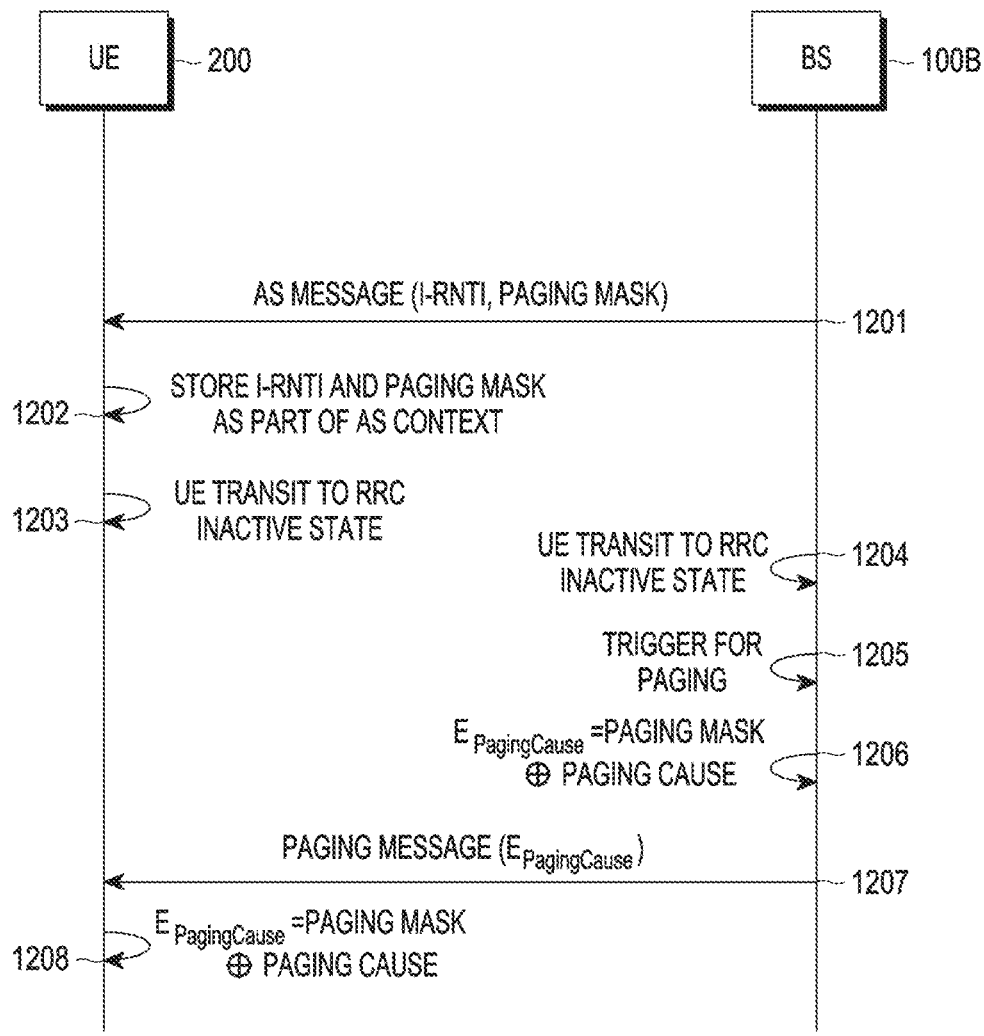

FIGS. 11-12 are sequential diagrams illustrating signaling between the wireless network device (100) and the UE (200) (200) for protecting the paging causes using the paging mask, according to an embodiment as disclosed herein. As shown in the FIG. 11, at 1101, the AMF (100A) sends the NAS paging message as a part of the registration procedure or a service request procedure to the UE (200), by assigning/re-allocating the paging mask along with an assignment/re-allocation of the GUTI to protect the paging cause. In an embodiment, the paging mask is assigned by the AMF (100A) during a NAS security mode command procedure (e.g. while sending a NAS security mode command message) for the NAS paging.

In an embodiment, the UE (200) and the AMF (100A) negotiates the paging mask value using the NAS signalling messages. At 1102, the UE (200) stores the GUTI and the paging mask. At 1103, the UE (200) transits to the idle mode. At 1104, the AMF (100A) detects that the UE (200) is in the idle mode and receives a notification to send the paging message at 1105. At 1106, the AMF (100A) ciphers the paging cause using the paging mask and broadcasts the encrypted paging cause (EPagingCause) to the BS (100B). In an example the XOR operation is performed between the paging mask and the paging cause value for encrypting the paging cause value. XOR is an example but different bit operations such as a left shift, a right shift bits, AND, NOT, OR, bit mathematical operations are possible. Bits of an information to encrypt can be shifted to right or left of the paging cause value. i.e. when the paging cause value is 011 and the shift is on right side, then a) with 1 places, then the encrypt paging cause value becomes 101, b) with 2 places, then the encrypt paging cause value becomes 110.

In an embodiment, the number of shifts (i.e. changing places) are provided by the AMF (100A) in the NAS message for the paging. In an embodiment, the number of shifts are performed by selecting a value in an identifier such as a Mobile Subscriber Identification Number (MSIN). For example, if the value of the MSIN=0123456789, then the AMF (100A) and the UE (200) know the last value "9" to be used for number of shifts (i.e. nine shifts). Thus, the paging mask value assigned in general will be used for bit operation on the paging cause value.

At 1107, the AMF (100A) sends the N1AP message includes the encrypted paging cause to the BS (100B). At 1108, the BS (100B) sends the paging message includes the encrypted paging cause to the UE (200). At 1109, the UE (200) performs the XOR operation between the encrypted paging cause and the paging mask and determines the actual paging cause value. The AMF (100A) applies the cipher to the paging cause value while paging, and the UE (200) deciphers the paging cause value. After deciphering, the UE (200) understands the paging cause value and the type of traffic pending to be delivered to the UE (200).

As shown in the FIG. 12, at 1201 the BS (100B) sends the AS paging message as a part of a RRCRelease with suspendConfig message to the UE (200), by assigning/re-allocating the paging mask along with an assignment/re-allocation of a Inactive-Radio Network Temporary Identifier (I-RNTI) to protect the paging cause. In an embodiment, the AMF (100A) provides the paging mask to the UE through the BS (100B) for protecting the paging cause during the AS paging procedure. In an embodiment, the paging mask is assigned by the BS (100B) during a AS security mode command procedure (e.g. while sending a AS security mode command message) for the AS paging. In an embodiment, the UE (200) and the AMF (100A) negotiates the paging mask value using the AS signaling messages. At 1202, the UE (200) stores the I-RNTI and the paging mask. At 1203, the UE (200) transits to the RRC inactive state. At 1204, the BS (100B) detects that the UE (200) is in the RRC inactive state, and receives a notification to send the paging message at 1205.

At 1206, the BS (100B) ciphers the paging cause using the paging mask and broadcasts the encrypted paging cause (EPagingCause) to the UE (200). In an example the XOR operation is performed between the paging mask and the paging cause value for encrypting the paging cause value. XOR is an example but different bit operations such as a left shift, a right shift bits, AND, NOT, OR, bit mathematical operations are possible. Bits of an information to encrypt can be shifted to right or left of the paging cause value. i.e. when the paging cause value is 011 and the shift is on right side, then
a) with 1 places, then the encrypt paging cause value becomes 101,
b) with 2 places, then the encrypt paging cause value becomes 110.

In an embodiment, the number of shifts (i.e. changing places) are provided by the BS (100B) in the NAS message for the paging. In an embodiment, the number of shifts are performed by selecting a value in the identifier such as the MSIN. For example, if the value of the MSIN=0123456789, then the AMF (100A) and the UE (200) know the last value "9" to be used for number of shifts (i.e. nine shifts). Thus, the paging mask value assigned in general will be used for bit operation on the paging cause value.

At 1207, the BS (100B) sends the paging message includes the encrypted paging cause to the UE (200). At 1208, the UE (200) performs the XOR operation between the encrypted paging cause and the paging mask and determines the actual paging cause value. The BS (100B) applies the cipher to the paging cause value while paging, and the UE (200) deciphers the paging cause value. After deciphering, the UE (200) understands the paging cause value and the type of traffic pending to be delivered to the UE (200).

In an embodiment, the paging mask value provided/assigned/allocated/re-allocated by the wireless network device (100) to the UE (200) is provided to the RAN node (e.g. gNB), which can be used by RAN node while performing paging operation in the RRC INACTIVE state. The assignment/allocation/re-allocation of the paging cause values are frequent and a frequency of the assignment/allocation/re-allocation of the paging cause values is decided based on the operator implementation. i.e. the paging cause value can be changes at each time of a RRC connection establishment and the UE (200) moves from the idle mode to the connected mode or the RRC INACTIVE state to the connected state.

In another embodiment, the wireless network device (100) itself indicates to the UE (200) the paging mask which is used to cipher the paging cause value without the UE (200) to making any request.

In an embodiment, the paging mask is also used to protect the cause values i.e. RRC establishment cause, RRC resume cause or RRC-reestablishment cause values while sending the paging cause values from the UE (200) to the BS (100B), where the UE (200) is a sending entity of cause value and the BS (100B) is a receiving entity of cause value.

In an embodiment, the paging mask or assigned paging cause value for a given service is stored in UE (200) when the UE (200) does a switch off event. The UE (200) and the wireless network device (100) use the same value after switch on. In another embodiment, the paging cause value is explicitly indicated by the wireless network device (100) to the UE (200) in the NAS message to use the stored old values without a need for reassignment during a current NAS procedure. When the user removes a Universal Subscriber Identity Module (USIM) and stores in another UE (200), then the UE (200) indicates to the wireless network device (100) that it does not have a assigned paging cause value or the paging mask. Further, the wireless network device (100) reconfigures the UE (200) and/or another UE (200).

In another embodiment, the wireless network device (100) detects that an International Mobile Subscriber Identity (IMSI) and the IMEI combination changes, then the wireless network device (100) and the UE (200) use a default paging cause and paging mask values until the wireless network device (100) configures a new paging cause or paging mask values to the UE (200), where the new paging mask shall be sent to the UE (200) only after a successful activation of the NAS security and/or the AS security.

In an embodiment, the wireless network device (100) wants to query the UE (200) about the latest paging cause values or the paging mask value stored in the UE (200). The wireless network device (100) queries to the UE (200) using the NAS message, and the UE (200) sends the latest stored respective values to the wireless network device (100). In an example, the wireless network device (100) sends a configuration update command (i.e. first NAS message) asking for the latest paging cause values or the paging mask, and the UE (200) responds to the wireless network device (100) in a configuration update complete (i.e. second NAS message). Whenever, the wireless network device (100) says that the NAS message will assign a parameter like the paging cause or the paging mask to the UE (200), the NAS message can be sent over a 3rd Generation Partnership Project (3GPP) access or a non-3GPP access. The paging cause value assigned to the UE (200) means, both the UE (200) and the wireless network device (100) understands and stores the value which is assigned to the service. The wireless network device (100) uses the value to indicate the respective service is pending on the wireless network device (100) to the UE (200) during the paging procedure.

The randomized paging cause values or the paging mask are assigned to the UE (200) by the wireless network device (100) only if the UE (200) requests to the wireless network device (100) in a first NAS message like a registration request, a uplink NAS transport or a service request etc. The wireless network device (100) assigns the paging cause values or the paging mask in a second NAS message for example a registration accept or a UE (200) configuration update or a downlink NAS transport. The request from the UE (200) to assign the paging cause values or the paging mask can also be made by indicating a support of a dual subscriber identity module (SIM) or a Multiple Universal Subscriber Identity Modules (MUSIM) feature, the support does not mean hardware support but actually 2 or more active USIMs are present in the UE (200). Conditions to assign the paging mask and the paging cause values are discussed which are also applicable to create the NAS/AS level security for encoding the paging cause value.

The sending entity is the wireless network device (100) to send the paging cause value in encrypted way, and the receiving entity is the UE (200) which decrypts the encrypted paging cause value as per the embodiments discussed in this disclosure. The sending entity and the receiving entity can be interchanged and same security methods discussed in this disclosure are applicable. i.e. for the RRC establishment cause, the RRC resume cause, the RRC-reestablishment cause values (all three together are called as cause values in this embodiment) can be protected with:

a) Randomization technique: That is the wireless network device (100) (either core network or RAN node) can assign different cause values for each of the establishment cause, resume cause or re-establishment cause values in NAS or AS signaling message.

b) Paging mask can also be used to mask the cause values while sending from the UE (200) to the wireless network device (100).

c) The cause values can be protected with the security parameters with the NAS based protection method.

d) The cause values can be protected with the security parameters with AS based protection method.

The paging mask value is different for DL direction information (i.e. paging cause) and for UL direction information (i.e. cause values such as RRC establishment cause, RRC resume cause or RRC-reestablishment cause values). The embodiments discussed in this disclosure can be used to calculate both the UL paging mask and the DL paging mask. When the paging message is received with the paging cause value, the UE (200) determines the cause values (i.e. RRC establishment cause, RRC resume cause or RRC-reestablishment cause values) based on the received paging cause value. So that the RAN node knows the exact reason for accessing. For example, if the paging cause value indicates voice call then the cause value should be set to Mobile Originated—Multimedia Telephony (MO-MMTEL)/Mobile Terminated—Multimedia Telephony (MT-MMTEL), or if the paging cause values in the DL direction is set to the SMS then the establishment cause is set to Mobile Originated SMS (MOSMS)/Mobile Terminated SMS (MTSMS) in the UL direction.

In an embodiment, irrespective of the paging cause value the UE (200) sets the cause values (i.e. RRC establishment cause, RRC resume cause or RRC-reestablishment cause values) as "MT-access" which indicates that the access is due to a response of the paging message to the wireless network device (100).

In existing methods and systems, when the paging message is received by the UE either due to a RAN level paging when the UE is in an RRC inactive state or a core network paging when the UE in an IDLE state, the UE is expected to respond to paging message immediately and if UE is not able to respond to the paging message for example due to UE being busy in other SIM stack, the UE will consider the received paging message transaction as completed. However if the UE becomes free next moment still the UE does not respond to paging because UE considers incoming paging transaction is completed earlier when UE had decided to not respond to paging. But on the network side still it might be waiting for the UE to respond to paging and hold downlink data. Thus due to non-response of UE for incoming paging message UE will end up missing the services like voice call, SMS, UE configuration update, Downlink (DL) Network-attached storage (NAS) TRANSPORT, Steering of Roaming information, internet data etc. Thus there is a need for network to provide a timer value to the UE until which UE can respond to paging message.

Therefore, a method and system for handling Scheduling Request (SR) procedure for Multi Subscriber Identity Module User Equipments (MUSIM UEs) is proposed in this disclosure to solve the problem in the existing methods and systems. In the proposed method the UE can have a timer value (for example timer Tx) up to which UE is allowed to respond to paging message to receive the downlink service, i.e. before timer Tx expires if UE becomes free from alternate Subscriber Identity Module (SIM) stack then UE can respond to paging message; otherwise if the timer Tx expires then UE will ignore the received paging message to not receive the downlink services.

Figure 13:
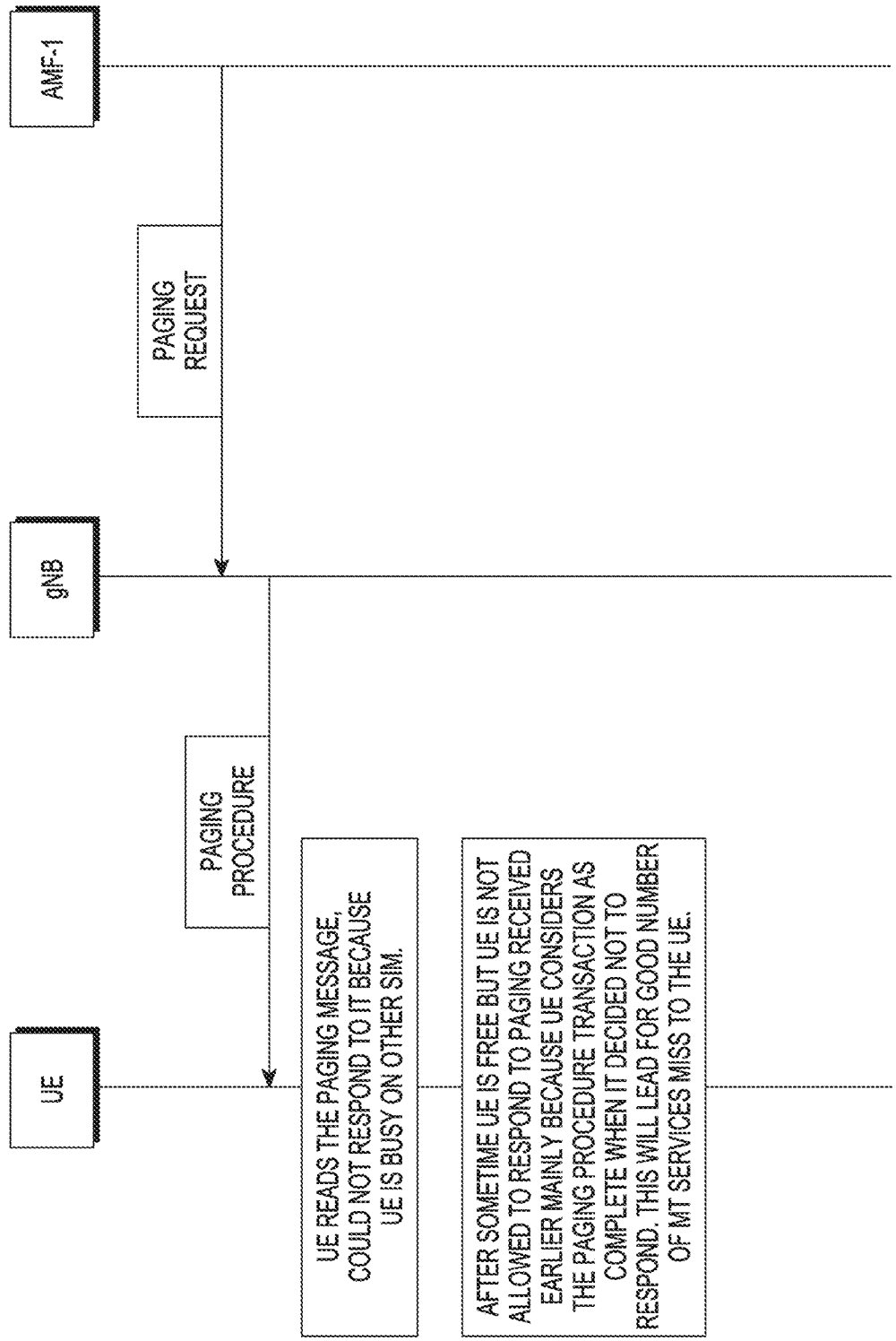
FIG. 13 is a signaling diagram illustrates a scenario of SIM-1 is busy due to ongoing service and receiving paging message for SIM-2 in idle mode, according to the prior art.

FIG. 13 is a signaling diagram illustrates a scenario of SIM-1 is busy due to ongoing service and receiving paging message for SIM-2 in idle mode, according to the prior art.

Referring to the FIG. 13 consider a conventional methods and systems, MUSIM UE is busy on SIM-1, receives Paging message for the SIM-2 (in IDLE mode). SIM-2 stack could not respond to paging message as UE is busy on SIM-1 with a priority or preferred service. After sometime the ongoing service on SIM-1 is release or completed. Now the UE is free on both SIM-1 and SIM-2 stacks. But still the UE is not allowed to respond to paging message received for SIM-2 stack received earlier, mainly because UE considers the paging procedure transaction is completed and network might have aborted the Paging procedure by now. On the other hand network may still be holding the Down link (DL) data and waiting for the UE to respond to the sent paging message. This leads to mobile terminated service failure, like call drop, delay in SMS delivery, could not updated the UE configuration etc.

Figure 14:
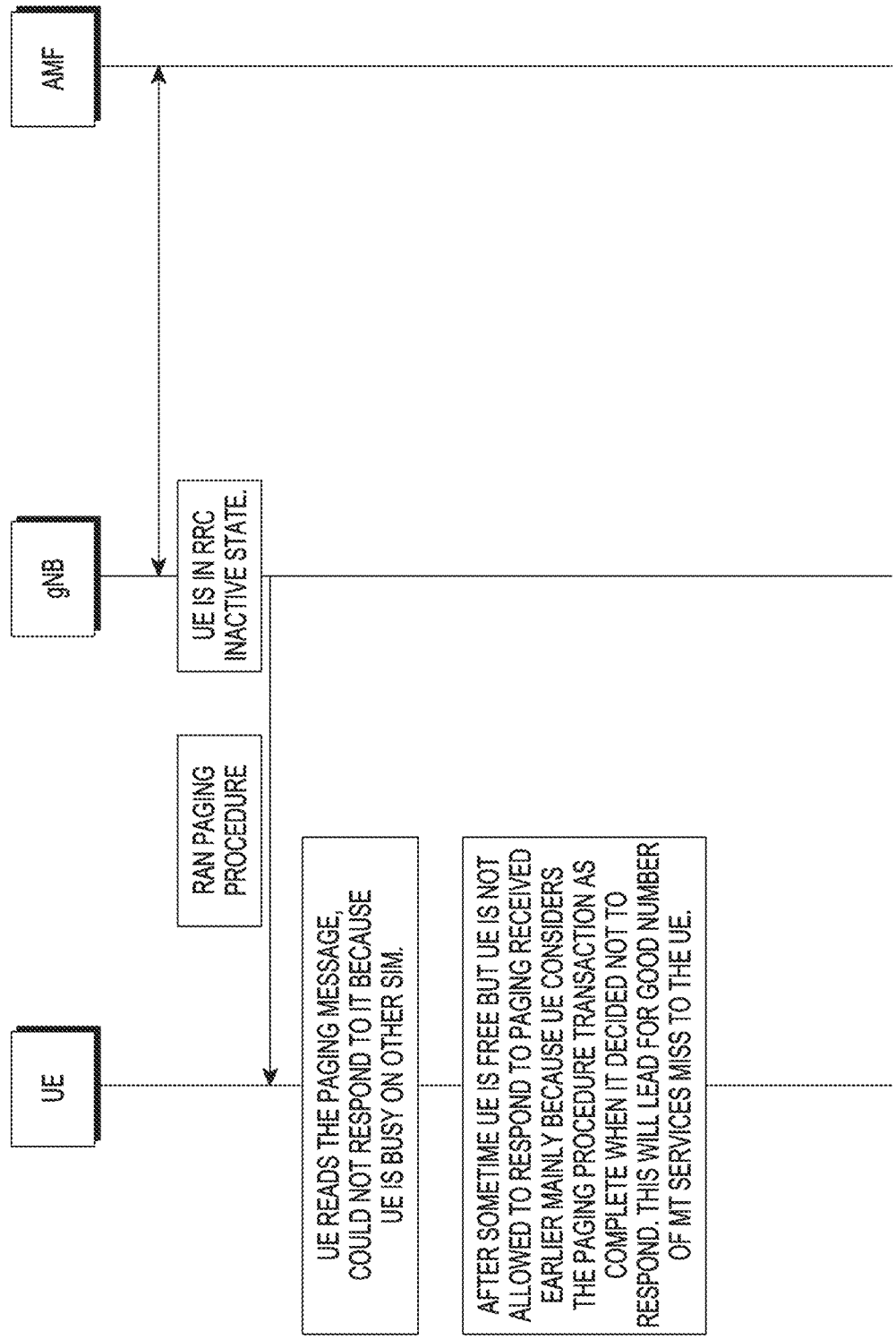
FIG. 14 is another signaling diagram illustrates a scenario of SIM-1 is busy due to ongoing service (or any procedure) and receiving paging message for SIM-2 in idle mode, according to the prior art.

FIG. 14 is another signaling diagram illustrates a scenario of SIM-1 is busy due to ongoing service (or any procedure) and receiving paging message for SIM-2 in idle mode, according to the prior art.

Referring to the FIG. 14 consider a conventional methods and systems, MUSIM UE is busy due to ongoing services on SIM-1, receives Paging message for the SIM-2 (in INACTIVE state). SIM-2 stack could not respond to paging message as UE is busy on SIM-1 with a priority or preferred service. After sometime the ongoing service on SIM-1 is release or completed. Now the UE is free on both SIM-1 and SIM-2 stacks. But still the UE is not allowed to respond to paging message received for SIM-2 stack earlier, mainly because the UE considers the paging procedure transaction is completed and network might have aborted the Paging procedure by now. On the other hand network may still be holding the Downlink (DL) data and waiting for the UE to respond to the sent paging message. This leads to mobile terminated service failure, like call drop, delay in SMS delivery, could not updated the UE configuration etc.

MUSIM UE is busy on SIM-1 due to ongoing service, receives Radio Access Network (RAN) based Paging message in INACTIVE state for the SIM-2. SIM-2 stack could not respond to paging message as UE is busy on SIM-1 with a priority or preferred service. After sometime the ongoing service on SIM-1 is release or completed. Now UE is free on both SIM-1 and SIM-2 stacks. But still the UE is not allowed to respond to paging message received in state 1, mainly because UE considers the paging procedure transaction is completed and network (e.g. gNB) might have aborted the Paging procedure by now. On the other hand network may still be holding the Downlink (DL) data and waiting for the UE to respond to the sent paging message. This leads to mobile terminated service failure, like call drop, delay in SMS delivery, could not updated the UE configuration etc.

Figure 15:
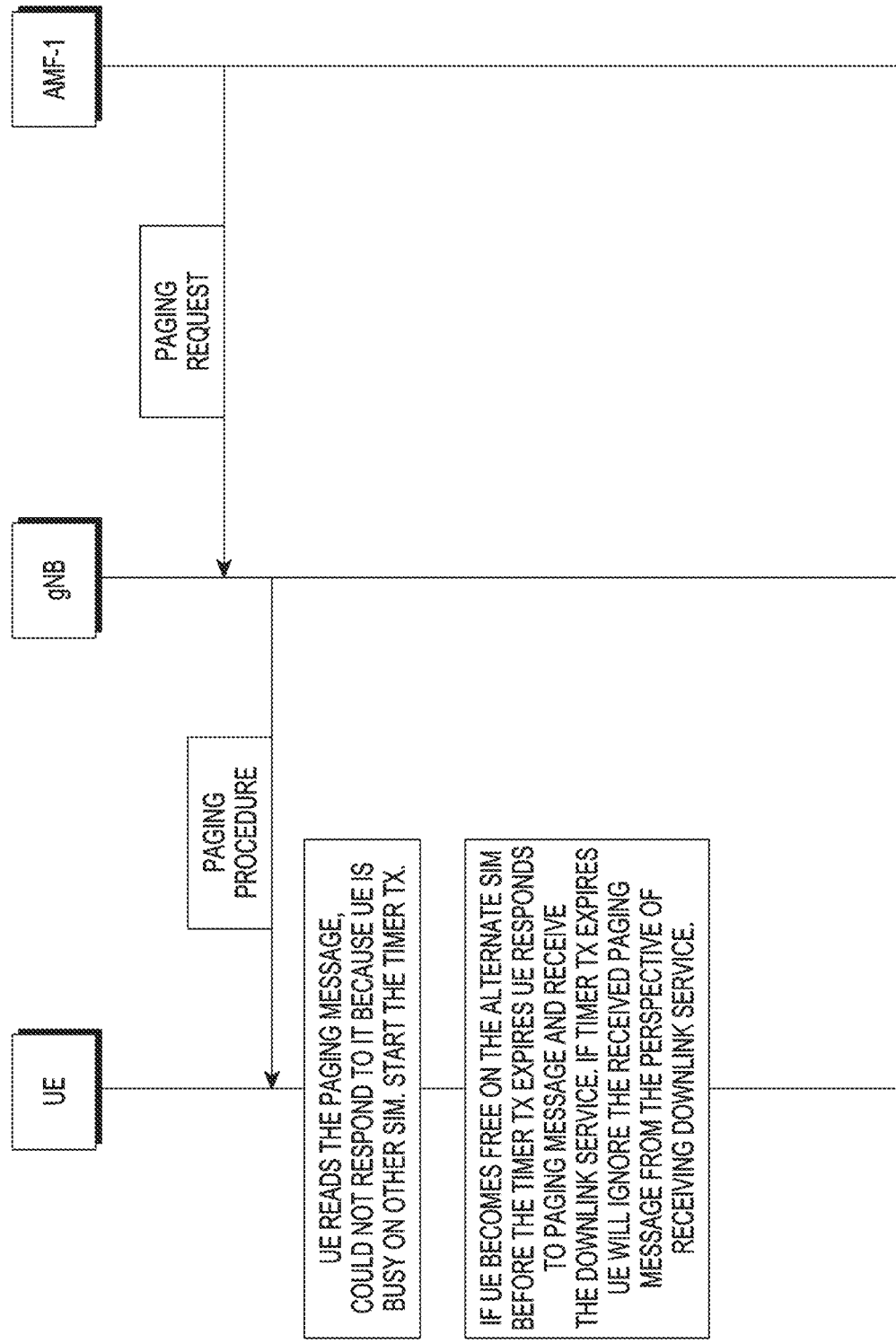
FIG. 15 is a signaling diagram illustrates a scenario of UE in which the time will be configured, according to the embodiments as disclosed herein.

FIG. 15 is a signaling diagram illustrates a scenario of UE in which the time will be configured, according to the embodiments as disclosed herein.

Referring to the FIG. 15 consider a proposed method, UE can have a timer value (for example timer Tx) up to which UE is allowed to respond to paging message by sending NAS message to receive the downlink service, i.e. when UE receives the paging message, UE starts this timer Tx and if before timer Tx expires if UE becomes free from alternate SIM stack then the UE can respond to paging message; otherwise if the timer Tx expires then the UE will ignore the received paging message or send busy indication in NAS message to not receive the downlink services. The timer value can be configured in the UE by network in Non Access Stratum (NAS) message or Access Stratum (AS) message or using the down link data over the user plane resources or over the top messages like SMS. The timer value can be pre-configured in the UE (optionally by the operator) or dynamically provided by the operator to the UE. The timer value can be determined by the UE in the implementation dependent mechanism. When a timer is running if a new Paging message is received then the UE should restart the timer Tx, i.e. stop and start with initial value. If Paging message is received with different Paging cause values then the UE can:
  a) Run different timer(s) for each Paging cause(s) received; in this case when UE becomes free on alternate SIM, UE again checks all the paging causes UE received for which corresponding timer is running if any of that service is considered priority then UE will respond to paging with NAS procedure (service request or registration request).
  b) Run a single timer which is restarted each time a new Paging message is received irrespective of the Paging cause.

In this embodiment the term UE will respond to paging means UE will send NAS message like Service request or Registration request message and get into connected mode to receive the downlink service (downlink user data) or signaling message from the network.

In this embodiment the term UE will not respond to paging message mean UE can ignore the incoming paging message or send the NAS busy indication i.e. paging reject indication as part of NAS message to the network.

In this embodiment the term SIM-1, SIM-2 refers to the respective protocol stacks within the same MUSIM UE. i.e. they behave as individual UEs within the MUSIM UE. i.e. MUSIM UE will have multiple stacks each stack for a given SIM(or subscription).

In this embodiment the timer can be received in NAS message and UE-NAS will provide the same to UE-AS layer, similarly it can be received in UE-AS layer and it can be provided to the UE-NAS layer.

The solution is explained considering the UE is in IDLE mode and receives paging message from network. Same solution is applicable when the UE is in RRC_INACTIVE state and receives RAN paging message, that is the paging message initiated by gNB when the UE is in RRC_INACTIVE state, UE will start the timer Tx, UE is allowed to respond to paging by sending the RAN message(like resume request) till the timer is running and if timer Tx expires UE will ignore the received RAN paging message or send the RAN message with busy indication to the network.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a wireless network device in a wireless communication system, the method comprising:
  receiving a Non-Access Stratum (NAS) message from a User Equipment (UE), wherein the NAS message comprises a paging cause of a service provided by the wireless network device and a first paging cause value corresponding to the paging cause;
  generating a second paging cause value to be used by the UE based on the first paging cause value, wherein the second paging cause value enables the UE to respond to a paging message based on the second paging cause value;
  encrypting the second paging cause value;
  generating a NAS response message comprising a security parameter for decoding the encrypted second paging cause value;
  sending the NAS response message to the UE; and
  sending the paging message to the UE, wherein the paging message comprises the encrypted second paging cause value,
  wherein the NAS message is a registration request message,
  wherein the NAS response message is a registration accept message, and
  wherein the wireless network device is a base station.

2. The method of claim 1, further comprising:
  modifying the second paging cause value to a third paging cause value, wherein the third paging cause value enables the UE to respond to the paging message based on the third paging cause value; and
  sending one of a UE configuration update message and a downlink NAS transport message to the UE, wherein the UE configuration update message and the downlink NAS transport message comprise the paging cause of the service and the third paging cause value.

3. A wireless network device in a wireless communication system, the wireless network device comprising:
a communicator; and
a processor;
wherein the processor is configured to:
receive a Non-Access Stratum (NAS) message from a User Equipment (UE), wherein the NAS message comprises a paging cause of a service provided by the wireless network device and a first paging cause value corresponding to the paging cause,
generate a second paging cause value to be used by the UE based on the first paging cause value, wherein the second paging cause value enables the UE to respond to a paging message based on the second paging cause value,
encrypt the second paging cause value,
generate a NAS response message comprising a security parameter for decoding the encrypted second paging cause value,
send the NAS response message to the UE, and
send the paging message to the UE, wherein the paging message comprises the encrypted second paging cause value,
wherein the NAS message is a registration request message,
wherein the NAS response message is a registration accept message, and
wherein the wireless network device is a base station.

4. The wireless network device of claim 3, wherein the processor is further configured to:
modify the second paging cause value to a third paging cause value, wherein the third paging cause value enables the UE to respond to the paging message based on the third paging cause value, and
send one of a UE configuration update message and a downlink NAS transport message to the UE, wherein the UE configuration update message and the downlink NAS transport message comprise the paging cause of the service and the third paging cause value.

* * * * *